United States Patent [19]
Ramamurti

[11] Patent Number: 4,560,870
[45] Date of Patent: Dec. 24, 1985

[54] GRATICULE SENSOR HAVING A PLURALITY OF LIGHT DETECTORS

[75] Inventor: Krishnamurti Ramamurti, Wilmette, Ill.

[73] Assignee: Tokyo Shibaura Denki Kabushiki Kaisha, Japan

[21] Appl. No.: 525,244

[22] Filed: Aug. 22, 1983

[51] Int. Cl.⁴ .............................................. G01D 5/34
[52] U.S. Cl. .............................. 250/237 G; 340/347 P
[58] Field of Search ..................... 250/231 SE, 237 G; 340/347 P; 356/375, 395

[56] References Cited
U.S. PATENT DOCUMENTS 3,633,038  1/1972  Falk ................................ 250/237 G
4,066,906  1/1978  Hounsfield et al. .
4,074,258  2/1978  Doré et al. ..................... 250/231 SE

OTHER PUBLICATIONS

"Techniques for Digitizing Rotary and Linear Motion" by Dynamics Research Corp., Sep. 1976, pp. 4-1 through 4-11.

Primary Examiner—Edward P. Westin
Attorney, Agent, or Firm—Finnegan, Henderson, Farabow, Garrett & Dunner

[57] ABSTRACT

A sensor for determining the position of a graticule which has a series of transparent and opaque areas back-illuminated with a diffused source of light. The shadow cast by the graticule is then focused onto a light detector array. Alternate elements of the light detector array are connected in parallel to provide two signals which are 180 degrees out of phase from each other. These signals are then processed and subtracted so that amplitude transitions result as the graticule alternately covers and uncovers detector elements.

9 Claims, 10 Drawing Figures

GRATICULE SENSOR HAVING A PLURALITY OF LIGHT DETECTORS

BACKGROUND OF THE INVENTION

I. Field of the Invention

The present invention relates to a sensor for producing pulses in response to relative movement between the sensor and a graticule.

II. Description of the Prior Art

Optical incremental sensors are widely used to monitor rotary and linear motion. Optical incremental sensors typically generate a symmetrical repeating waveform that is utilized to monitor relative motion between the sensor and another item. The basic components of such optical sensors typically include a light source, a light shutter (including a graticule and a mask), a light sensor, and an encoder circuit which operates upon the output of the light sensor to provide an output signal.

One form of such prior art optical incremental sensor is illustrated in FIG. 1 as comprising a light source 10, a graticule 12, light detectors 14 and 16, and masks 18 and 20. Graticule 12 typically consists of a plurality of equal width alternate opaque and non-opaque portions 22, 24. Masks 18 and 22 also comprise a plurality of alternating equal width opaque and non-opaque portions 26, 28.

Masks 18 and 20 are aligned between graticule 12 and sensors 14 and 16 such that when light from source 10 passes through graticule 12, mask 18 is aligned so as to permit this light to strike sensor 14 whereas mask 20 at that moment is aligned so as to prevent such light from reaching sensor 16. As graticule moves with respect to masks 18 and 20, eventually light passing through graticule 12 is blocked by mask 18 from reaching sensor 14 whereas at precisely that moment light passing through graticule 12 is permitted to pass through mask 20 and reach sensor 16. Accordingly, an output A of sensor 14 is exactly 180 degrees out of phase with an output B of sensor 16. When the output A is subtracted from output B, the resultant signal is indicative of the location of graticule 12. More specifically, the resultant difference signal between output A and output B, when sensors 14 and 16 are perfectly balanced, will cross an average value each time graticule 12 is moved the width of one of opaque or non-opaque sections 22, 24.

However, it is very difficult to align masks 18 and 20 in the proper orientation to be sure that the output of sensor 14 will be precisely 180 degrees out of phase with the output of sensor 16. Moreover, prior art of the type illustrated in FIG. 1 has the disadvantage of requiring the utilization of new masks each time the pitch of graticule 12 (the total width of an opaque portion 22 and a non-opaque portion 24) is altered, since the pitch of graticule 12 must correspond with the pitch of masks 18 and 20. Accordingly, each time a graticule with a different pitch is employed, new masks must be carefully positioned 180 degrees out of phase with one another.

It is, accordingly, an object of the subject invention to provide a graticule sensor which provides a highly accurate output without the necessity of incorporating masks.

It is also an object of the present invention to provide a graticule sensor in which the same sensor can be utilized when changes in graticule pitch are made.

Additional objects and advantages of the invention will be set forth in part in the description which follows, and in part will be obvious from the description or may be learned by practice of the invention.

SUMMARY OF THE INVENTION

To achieve the foregoing objects and in accordance with the purposes of the invention as embodied and broadly described herein, a graticule sensor is provided which comprises: (a) a light source; (b) a plurality of light detectors; (c) a lens for focusing a shadow upon the light detectors which shadow is formed by illumination of the graticule with the light source; and (d) means for combining the outputs of the light detectors to provide a signal indicative of the relative motion between the graticule and the light detectors. More specifically, the graticule preferably has a plurality of equal width sections having opaque and non-opaque portions and the sensor preferably comprises: (a) a light source for illuminating a plurality of the sections of the graticule; (b) a light detector array having a plurality of equal width sections each having a first and second light detector; (c) a lens, the graticule, light source, light detector array, and lens being arranged to have the graticule cast a shadow upon the array with the shadow having a plurality of equal width sections each having alternate dark and light portions, and with the lens arranged to make the width of each section of the shadow substantially equal to the width of each section of the array, and with the array arranged to have the shadow move across the array upon relative movement of the graticule and the array such that each dark and light portion of the shadow sequentially strikes each first and second light detector of the array; and (d) means for combining the outputs of the first light detectors and means for combining the outputs of the second light detectors.

Preferably, the sensor of the subject invention includes means for adjusting the position of the lens with respect to the graticule and the array to accommodate graticules having different pitch. It is also preferable that the lens take the form of a cylinder lens. It is still further preferable that the sensor include means for subtracting the combined outputs of the first light detectors from the combined outputs of the second light detectors.

In a more narrower sense, the graticule sensor of the subject invention is adapted for use in connection with a graticule which has an alternating sequence of equal width opaque and non-opaque portions with the sensor comprising: (a) a light source for illuminating a plurality of the portions; (b) a light detector array having a plurality of equal width light detectors; (c) a lens, with the graticule, light source, light detector array, and lens being arranged to have the graticule cast a shadow through the lens and upon the array with the shadow having a plurality of equal width alternate light and dark portions, with the lens arranged to make the width of each portion of the shadow substantially equal to the width of one of the light detectors, and with the array arranged to have the shadow move across the array upon relative motion of the graticule and the array such that each dark and light portion of the shadow sequentially strikes each detector of the array; and (d) means for combining the outputs of every other light detector and means for combining the outputs of the remaining light detectors.

Again, it is preferable that the sensor include means for adjusting the position of the lens with respect to the graticule to accommodate graticules having different pitch. It is preferable that the lens be a cylindrical lens, and it is preferable that there be provided means for subtracting the combined outputs of every other light detector from the combined outputs of the remaining light detectors.

DESCRIPTION OF THE PREFERRED EMBODIMENT

Reference will now be made in detail to the present preferred embodiment of the subject invention as illustrated in the accompanying drawings.

Figure 1:
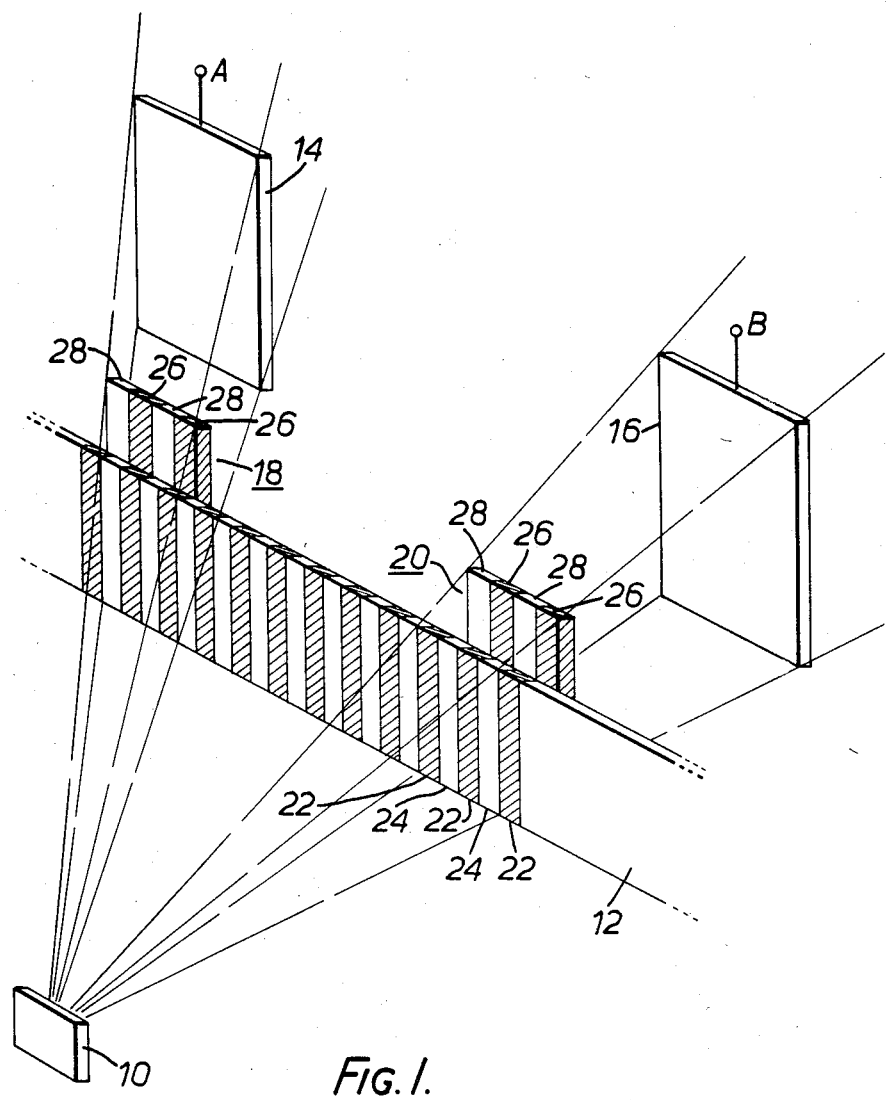
FIG. 1 illustrates a prior art graticule sensor.
Figure 2:
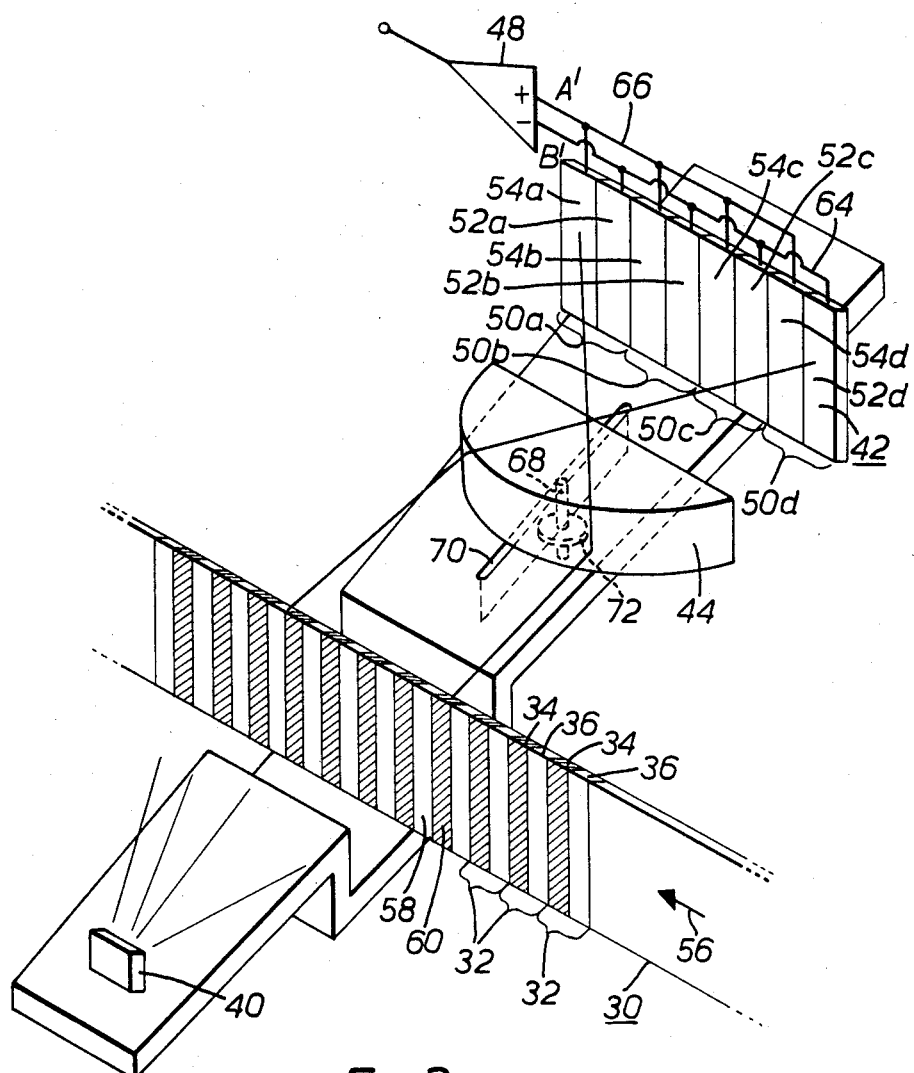
FIG. 2 illustrates a graticule sensor which incorporates the teachings of the present invention.

In the broadest sense, the subject invention provides a graticule sensor for a graticule which has a plurality of equal width sections, each having opaque and non-opaque portions. In this regard, a graticule 30 is illustrated in FIG. 2 as having a plurality of equal width sections 32 each having an opaque portion 34 and a non-opaque portion 36. As used herein in relation to a graticule, the term "section" refers to a portion of the graticule which defines a pattern that repeats. Accordingly, sections 32 define a pattern which repeats, with each of sections 32 having the same width as every other section 32. As used herein with regard to graticules, the term "portion" defines a part of a section. Accordingly, an opaque portion 34 and an adjoining non-opaque portions 36 together make up a section 32.

Although it is preferable that all portions 34 be the same width as all portions 36, this dimensional equivalence is not believed to be necessary. It is believed that the present invention will provide a useful indication of graticule position with unequal opaque and non-opaque portions 34 and 36, provided that sections 32 are all of equal width.

Graticule 30 may, for example, be a circular graticule which is used to determine the position of an X-ray tube as the tube rotates in a computer tomography (CT) scanner. For example, if graticule 30 employs 6,912 opaque portions 34 equally spaced over 360 degrees of rotation, the subject invention can provide precision within plus or minus ten arc seconds.

It should be understood that one of non-opaque portions 36 may be longer than the others in graticule 30 in order to provide a reference mark, as is well known to those skilled in the art.

When employed in a CT scanner which uses a stationary detector ring and an X-ray tube on a rotating ring that circles a patient, the graticule may remain stationary with respect to the patient and the detector ring, while the sensor of the subject invention is mounted on the rotating ring which supports the X-ray tube. Accordingly, as the ring which supports the X-ray tube rotates, there is relative movement between the graticule and the sensor. As is described below, the sensor of the present invention provides a series of electrical pulses as this relative movement occurs. These pulses may then be counted by an electronic counter to determine the precise positional relationship between the graticule and the X-ray tube. The use of a series of electrical pulses generated as a graticule moves with regard to a sensor is old in the art and not considered part of the subject invention. Accordingly, no detailed description of the electronic counter and associated electronic circuitry is provided, since such counter and circuitry is considered old in the art and well known to those skilled in the art.

The sensor illustratively shown in FIG. 2 includes a light source 40, a light detector array 42, a lens 44, a bracket 46, and a differential amplifier 48. Light source 40 is mounted at one end of bracket 46, while light detector array 42 is mounted on the opposite end of bracket 46. Light source 40 may, for example, comprise an infrared light emitting diode (LED).

Bracket 46 is illustrated in FIG. 2 as being positioned relative to graticule 30 such that light source 40 is located on one side of graticule 30 and light detector array 42 is located on the other side. Accordingly, light source 42 illuminates one side of graticule 30, with opaque and non-opaque portions 34, 36 of graticule 30 causing a resultant shadow to be cast upon light detector array 42, which shadow has alternate light and dark portions corresponding directly to opaque and non-opaque portions 34 and 36 of graticule 30.

Lens 44 is illustrated in FIG. 2 as being positioned on bracket 46 between graticule 30 and light detector array 42. Lens 44 is preferably constructed as a cylindrical lens instead of a standard round lens. With use of a cylindrical lens there is no magnification in the radial direction which is believed to produce somewhat better stability in the performance of the subject invention.

Light detector array 42 is illustrated as comprising a plurality of equal width sections 50 each having a first light detector 52a–b and a second light detector 54a–d. As used herein with regard to a light detector array, the term "section" refers to a part of a light detector array including two individual light detectors. Accordingly, the light detector array 42 illustrated in FIG. 2, comprises a total of four sections, and eight individual light detectors. A light detector array of this size is illustrated in FIG. 2 since devices of this type are readily available. However, it should be understood that larger photodetector arrays may be utilized which provide better averaging. However, it must be remembered that when graticule 30 include opaque and non-opaque portions 34, 36 which are radial on a circular arc, and the detectors of light detector array 42 are located in a straight line, a point will be reached in which the extreme sections of light detector array 42 will not receive sufficient light from any shadow cast by graticule 30 to be effective in the operation of the sensor.

In accordance with the present invention, the lens of the subject sensor is arranged to make the width of each section of the shadow cast by a graticule substantially equal to the width of each section of light detector array, with the array arranged to have the shadow move across the array upon relative movement of the graticule, and with the array aligned such that each light and dark portion of the shadow sequentially strikes each first and second light detector of the array. As illustratively shown in FIG. 2, lens 44 is mounted on bracket 46 at a point where the width of the shadow cast by each of sections 32 of graticule 30 on array 42 is substantially equal to the width of each section 50 of light detector array 42.

Moreover, graticule 30, lens 44 and light detector array 42 are illustrated in FIG. 2 as being arranged such that as graticule 30 moves in a direction indicated by arrow 56 with respect to bracket 46, a shadow cast by moving graticule 30 is a series of alternate light and dark portions which sequentially strike each of light detectors 52a–d and 54a–d. More specifically, light from non-opaque portion 58 of graticule 30 is focused by lens 44 to first strike light detector 52a, whereas the shadow cast by opaque portion 60 first strikes light detector 54a. As graticule 30 moves in the direction indicated by arrow 56, the shadow from portion 60 moves to strike light detectors 52a, 54b, 52b, 54c, 52c, 54d, 52d sequentially, while the light from non-opaque portion 58 moves to strike detectors 54b, 52b, 54c, 52c, 54d, and 52d, sequentially.

Figure 3A:
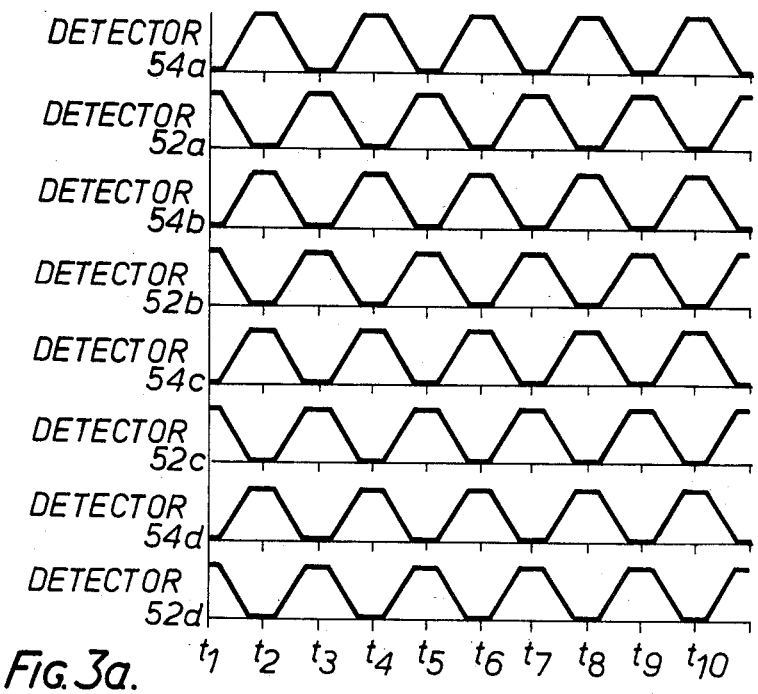
FIGS. 3A–3D illustrate the operation of a graticule sensor constructed in the manner illustrated in FIG. 2.

This sequence of operation is illustrated in FIG. 3A with the output of detector 54a first being low at time period T1 and the output of detector 52a being high. In a similar manner, the output of each of detectors 54b, 54c, and 54d is low while the output of detectors 52b, 52c, and 52d is high. As graticule 30 is moved to have opaque portion 60 replaced by the next non-opaque portion 62 of graticule 30, the output of detectors 54a–d becomes high while the output of detectors 52a–d which are now receiving a shadow from opaque portions 60 is low. This process continues as shown in FIG. 3A.

In accordance with the present invention, means are provided for combining the outputs of the first light detectors and for combining the outputs of the second light detectors. Preferably, means are provided for subtracting the combined outputs of the first light detectors from the combined outputs of the second light detectors.

Figure 3B:
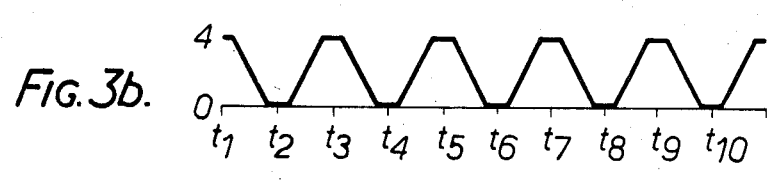
Figure 3C:

As shown in FIG. 2, the outputs of detectors 52a–d are combined together by conductor 64 and connected to the negative input of differential amplifier 48. Likewise, the outputs of detectors 54a–d are connected together by conductor 66 and coupled to the positive input terminal of differential amplifier 48. The combined outputs of detectors 52a–d is illustrated in FIG. 3B while the combined outputs of detectors 54a–d is illustrated in FIG. 3C. The output of differential amplifier 48 is illustrated in FIG. 3D.

Figure 3D:
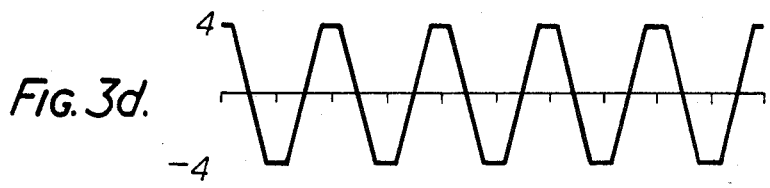

As may be seen from FIG. 3D, as an opaque portion 34 of graticule 30 is completely replaced with a non-opaque portion 36, the output of differential amplifier 48 passes through a zero reference level indicating that such movement has been completed. Accordingly, if a detector is connected to the output of differential amplifier 48 to detect each zero crossing, this detector will, in effect, be monitoring the position of graticule 30 with respect to the position of light detector array 42.

Figure 4A:
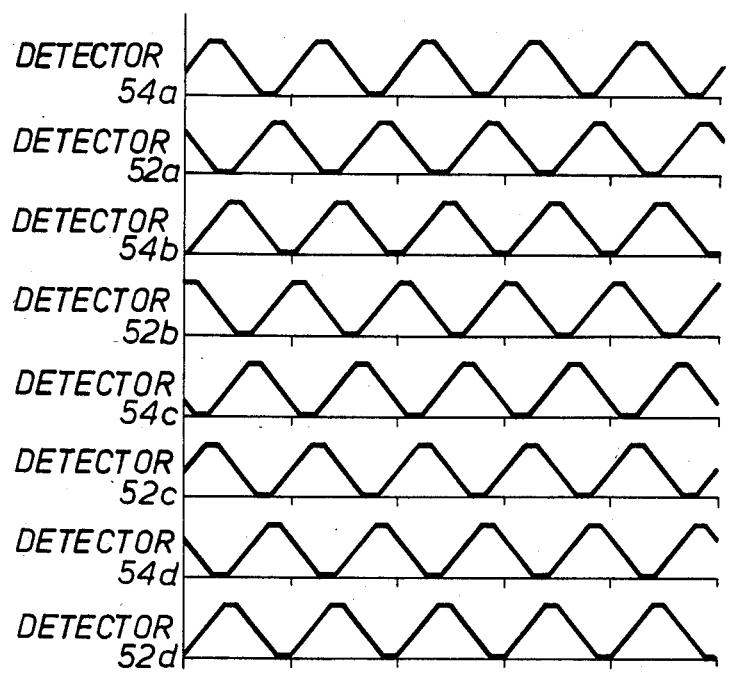
FIGS. 4A–4D further illustrate the operation of a graticule sensor constructed in accordance with the structure illustrated in FIG. 2.

As mentioned above, it is preferable that each section of light and dark portions of the shadow cast by graticule 30 have a width substantially equal to the width of each section 50 of light detector array 42. As the width of each shadow section varies from the width of each section of light detector array 42, the cross-over point of the resultant output signal from differential amplifier 48 shifts. This phenomenon is, for example, illustrated in FIGS. 4A–4D, wherein FIG. 4A illustrates the outputs of detectors 52a–d and 54a–d when the width of the section of a shadow cast by each section 32 of graticule 30 upon light detector array 42 is twenty percent greater than the width or "pitch" of each section 50a–d of light detector array 42. As used herein the term "pitch" refers to the "width" of either a section 32 of graticule 30 or of a section 50a–d of light detector array 42. In other words, the signals of light detectors 52a–d and 54a–d of FIG. 4A represent the output of these detectors when the pitch of graticule 30 is twenty percent greater than the pitch of light detector array 42.

Figure 4B:
Figure 4C:
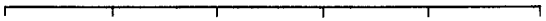
Figure 4D:
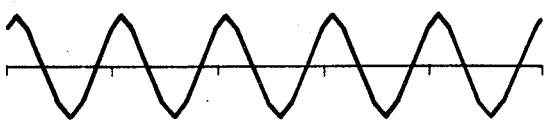

The combined outputs of detectors 52a–d is illustrated in FIG. 4B and the combined outputs of detectors 54a–d is illustrated in FIG. 4C. The difference between the outputs of detectors 52a–d and 54a–b is illustrated in FIG. 4D. As may be seen in FIG. 4D, the zero crossover point of the resultant signal does not occur at the precise moment when an opaque portion 34 is completely replaced with a non-opaque portion 36. Instead, there is approximately a ten percent shift in the cross-over position. However, once this shift in position is taken into account, the subsequent cross-over points are correctly timed to provide a highly accurate monitoring of the position of graticule 30. Accordingly, having the pitch of the shadow of graticule 30 within twenty percent of the pitch of detector array 42 is sufficient to generate a useful output in accordance with the teachings of the subject invention.

As alluded to above, the output of differential amplifier 48 may be connected to electronic circuitry which generates pulses each time the output from amplifier 48 crosses a certain reference level. These pulses may then be counted by an electronic counter. A separate sensor may be employed to detect when a reference position in graticule 30 is reached in order to reset the counter to zero.

It is contemplated that graticule 30 may for example have a pitch of 0.406 mm with each opaque and non-opaque portion 34, 36 having a width 0.203 mm, and that the detector array 42 may have a pitch of 1.270 mm with each light detector element 52a–d, 54a–d having a width of 0.635 mm.

Further in accordance with present invention there is provided means for adjusting the position of the lens with respect to the graticule of the array to accommodate graticules having different pitch. As illustratively shown in FIG. 2, lens 44 is mounted on a bolt 68 which extends through a slot 70 of bracket 46. A nut or other form of fastener 72 is located on the underneath of bracket 46 on bolt 68 to hold lens 44 in a desired position along slot 70. Accordingly, when a graticule 30 of a different pitch is employed, all that need be done is have the position of lens 44 readjusted so that the shadow formed by new graticule 30 has sections of light and dark portions which substantially correspond in width to the width of sections 50a–d of light detector array 42. Standard lens magnification calculations may be employed to determine the necessary position of lens 44.

It should also be understood that two light detector arrays could be employed having the same pitch and being offset one from the other by one and one-half times the pitch to produce two sets of signals which are 90 degrees out of phase from one another. Such an arrangement could be used to sense the direction of motion of graticule 30.

In summary, a simplified position sensor using a multiple element solid state detector array has been described. A graticule comprising a series of preferably equal width transparent and opaque areas is back-illuminated with a diffused source. A portion of the graticule is then imaged with a lens such that the graticule image substantially corresponds with the pattern of the detector array. Alternate elements of the detector array are connected in parallel to provide two signals which are 180 degrees out of phase from each other. These signals are then processed and subtracted so that amplitude transistions result as the graticule shadow alternately darkens and illuminates detector elements.

Accordingly, there has been described a graticule sensor in which separate masks are not employed, since the detector array itself performs the function provided by masks in known prior art devices. The use of two separate sensors out of phase with one another, as in conventional encoder systems, is not necessary. The parallel connection of alternate elements in the array of the subject invention accomplishes this function in a single unit. The detector array and graticule need not have the same pitch. Matching is accomplished by optical magnification or reduction as necessary. Moreover, the same sensor unit can be used when changes in graticule pitch are made. Only adjustments in optical position are required.

Non-uniformity of illumination at the detector array may be taken care of by weighting the sum of the detector elements. Moreover, since a single source of diffused illumination is employed, variations in light intensity will not contribute to error. A monolithic array of detectors is presently employed and, as a consequence, errors due to drift will be minimal. Moreover, since the graticule is back-illuminated and all other elements are on the other side, the arrangement of the subject invention can be used even where access to one side of a graticule is limited.

Additional advantages and modifications will readily occur to those skilled in the art. The invention in its broader aspects is not, therefore, limited to the specific details, representative methods and illustrative examples shown and described. Accordingly, departures may be made from such details without departing from the spirit or scope of applicant's general inventive concept.

I claim:
1. A graticule sensor comprising:
   (a) a light source;
   (b) more than two light detectors;
   (c) a lens for focusing a shadow upon said light detectors which is formed by illumination of said graticule with said light source; and
   (d) means for comparing the outputs of the sum of alternate ones of said light detectors with the sum of the remaining ones of said light detectors to provide a signal indicative of relative motion between said graticule and said light detectors.
2. A graticule sensor for a graticule which has a plurality of equal width sections each having opaque and non-opaque portions, said sensor comprising:
   a. a light source for illuminating a plurality of said sections of said graticule;
   b. a light detector array having a plurality of equal width sections each having a first light detector and a second light detector;
   c. a lens, said graticule, light source, light detector array, and lens being arranged to have said graticule cast a shadow through the lens and upon the array, said shadow having a plurality of equal width sections each having dark and light portions, with the lens arranged to make the width of each section of shadow substantially equal to the width of each section of the array, and with said array arranged to have said shadow move across said array upon relative motion of said graticule and said array, such tht each dark and light portion of said shadow sequentially strikes each first and second light detector of said array; and
   d. means for adding together the outputs of said first light detectors, for adding together the outputs of said second light detectors and for comparing the resultant sums to provide a signal indicative of relative motion between said graticule and said light detector array.
3. The sensor of claim 2 including means for adjusting the position of said lens with respect to said graticule and said array to accommodate graticules having different pitch.
4. The sensor of claim 2 where said lens is a cylinder lens.
5. The sensor of claim 2 including means for subtracting the added outputs of said first light detectors from the added outputs of said second light detectors.
6. A graticule sensor for a graticule which has an alternating sequence of equal width opaque and non-opaque portions, said sensor comprising:
   a. a light source for illuminating a plurality of said portions;
   b. a light detector array having more than two equal width light detectors;
   c. a lens, said graticule, light source, light detector array, and lens being arranged to have said graticule cast a shadow through said lens and upon said array, said shadow having a plurality of equal width dark and light portions, with said lens arranged to make the width of each portion of said shadow substantially equal to the width of one of said light detectors, and with said array arranged to have said shadow move across said array upon relative movement of said graticule and said array, such that each dark and light portion of said shadow sequentially strikes each detector of said array; and
   d. means for adding together the outputs of every other light detector, for adding together the outputs of the remaining light detectors and for comparing the resultant sums to provide a signal indicative of relative motion between said graticule and said light detector array.
7. The light sensor of claim 6 including means for adjusting the position of said lens with respect to said graticule and said array to accommodate graticules having different pitch.
8. The sensor of claim 6 wherein said lens is a cylinder lens.
9. The sensor of claim 6 wherein said means for comparing comprises means for subtracting said resultant sums of every other light detector from said resultant sums of the remaining light detectors.

* * * * *